UNITED STATES PATENT OFFICE.

NATHANIEL B. RICE, OF EAST SAGINAW, MICHIGAN.

IMPROVEMENT IN OBTAINING GELATINE FROM BONES, HORN-PITH, &c.

Specification forming part of Letters Patent No. 114,602, dated May 9, 1871.

*To all whom it may concern:*

Be it known that I, NATHANIEL B. RICE, of East Saginaw, in the county of Saginaw and State of Michigan, have invented a new and Improved Process of Obtaining Gelatine from Bone, &c.; and I do hereby declare that the following is a full, clear, and exact description thereof, which will enable others skilled in the art to make and use the same.

This invention relates to a new method of treating bone, horn-piths, or other equivalent substances, with the object of extracting therefrom the gelatine, size, and glue, as well as the phosphoric acid and phosphates, or either, as may be desired.

The invention consists chiefly in the application to the bone or similar substance of phosphoric acid, which dissolves and separates the mineral constituents, leaving the gelatinous matter free and ready for use. The invention consists also in such a treatment of the acid charged with earthy matter that it can again be separated therefrom for further use on fresh material. The expense of the treatment is thereby greatly reduced. Finally, the invention consists in such an arrangement of the aforesaid process of separating the mineral matter from the acid that the phosphoric acid of the bone is also taken therefrom and added to the acid used for original separation, so that an actual gain of acid is effected.

The following is the description of the process: The bone, horn-pith, or equivalent substance is placed in diluted phosphoric acid. The earthy matter of the bone, horn-pith, &c., is thereby dissolved and removed from the gelatine, which latter can be converted into size or glue, or refined for table or other uses, by any of the known processes. The acid is next recovered from the earthy matter, to be used for repetitions of the same process in the following manner: About two-thirds or more of the solution of acid phosphate of lime resulting from the above process are subjected to the action of sulphurous or sulphuric acid, which precipitates the lime in the form of sulphite or sulphate, either of which can be readily removed, leaving the acid or acid phosphate, according to the amount of sulphurous or sulphuric acid used, in an available condition for further use on other bone, horn-pith, &c. This process, by extracting the phosphates originally held in the bone or other similar substance treated, yields an actual surplus of phosphoric acid, so that almost fifty per cent. can be gained at each process.

The residuum from the last-described process, and that part of the said solution not treated with sulphurous or sulphuric acid, as aforesaid, can be used for fertilizing or other purposes.

In place of the phosphoric acid alone, a combination of it with any other acid or acids, in such proportions that the mixture will dissolve and remove the earthy matter in bone, horn-pith, or equivalent substances, may be used; but the simple phosphoric acid is more advantageous, as it acts in a satisfactory manner, and may be regained, as hereinbefore described.

Having thus described my invention, I claim as new and desire to secure by Letters Patent—

1. The process of treating bone, horn-pith, or equivalent substances by means of phosphoric acid, with or without other acid or acids, for the purpose of obtaining the gelatine, as set forth.

2. The herein-described method of separating and reclaiming the phosphoric acid from the solution of earthy matter by the addition of sulphurous or sulphuric acid, as set forth.

3. The process of separating the phosphoric acid added to the bone, together with that originally contained in the bone, from the earthy matter at one operation, as set forth.

NATHANIEL B. RICE.

Witnesses:
GEO. W. MABEE,
T. B. MOSHER.